(12) United States Patent
Cappuccini

(10) Patent No.: US 8,499,625 B2
(45) Date of Patent: Aug. 6, 2013

(54) PROCESS AND MACHINE FOR IDENTIFICATION AND WORKING OF DEFECTS ON USED TYRES

(76) Inventor: Leonardo Cappuccini, Rovereto (IT)

( * ) Notice: Subject to any disclaimer, the term of this patent is extended or adjusted under 35 U.S.C. 154(b) by 54 days.

(21) Appl. No.: 13/138,725

(22) PCT Filed: Mar. 24, 2010

(86) PCT No.: PCT/EP2010/053829
§ 371 (c)(1),
(2), (4) Date: Sep. 22, 2011

(87) PCT Pub. No.: WO2010/115711
PCT Pub. Date: Oct. 14, 2010

(65) Prior Publication Data
US 2012/0016522 A1 Jan. 19, 2012

(30) Foreign Application Priority Data
Mar. 31, 2009 (IT) .............................. MI2009A0505

(51) Int. Cl.
*G01M 17/02* (2006.01)
(52) U.S. Cl.
USPC .......................................................... 73/146
(58) Field of Classification Search
None
See application file for complete search history.

(56) References Cited

U.S. PATENT DOCUMENTS

| | | | | |
|---|---|---|---|---|
| 4,089,225 | A | * 5/1978 | Kraska et al. | ................... 73/614 |
| 4,936,138 | A | * 6/1990 | Cushman et al. | ............... 73/146 |
| 4,977,586 | A | * 12/1990 | Curry | .............................. 378/61 |
| 5,153,899 | A | * 10/1992 | Curry | .............................. 378/61 |
| 6,006,599 | A | 12/1999 | Kelm-Kläger | |
| 2001/0045125 | A1* | 11/2001 | Alexander | ...................... 73/146 |
| 2004/0083024 | A1 | 4/2004 | Wang | |

FOREIGN PATENT DOCUMENTS
EP 2 077 442 7/2009

* cited by examiner

*Primary Examiner* — Andre Allen
(74) *Attorney, Agent, or Firm* — Jacobson Holman PLLC

(57) ABSTRACT

An automatic process for the identification and working of defects (12) on used tires (6) is disclosed, comprising the steps of assembling the used tire (6) on rotative support and centring means (7), starting the rotation of the tire (6), automatic scanning of the working surface (30) of the tire (6) to identify the morphology of defects (12) by means of automatic identification means (8, 41) of defects (12), comparison between the morphology of the defect (12) identified and a virtual library of defects (12') of reference for the selection of the working and of the tool (9) to be used, charging the tool (9) chosen on an anthropomorphic robot (31), and executing the selected working on the defect (12) to form a crater (13) that is suitable for being coated, said steps being managed by a computerized control unit (11) comprising said virtual library of defects (12').

5 Claims, 2 Drawing Sheets

PROCESS AND MACHINE FOR IDENTIFICATION AND WORKING OF DEFECTS ON USED TYRES

Figure 1:
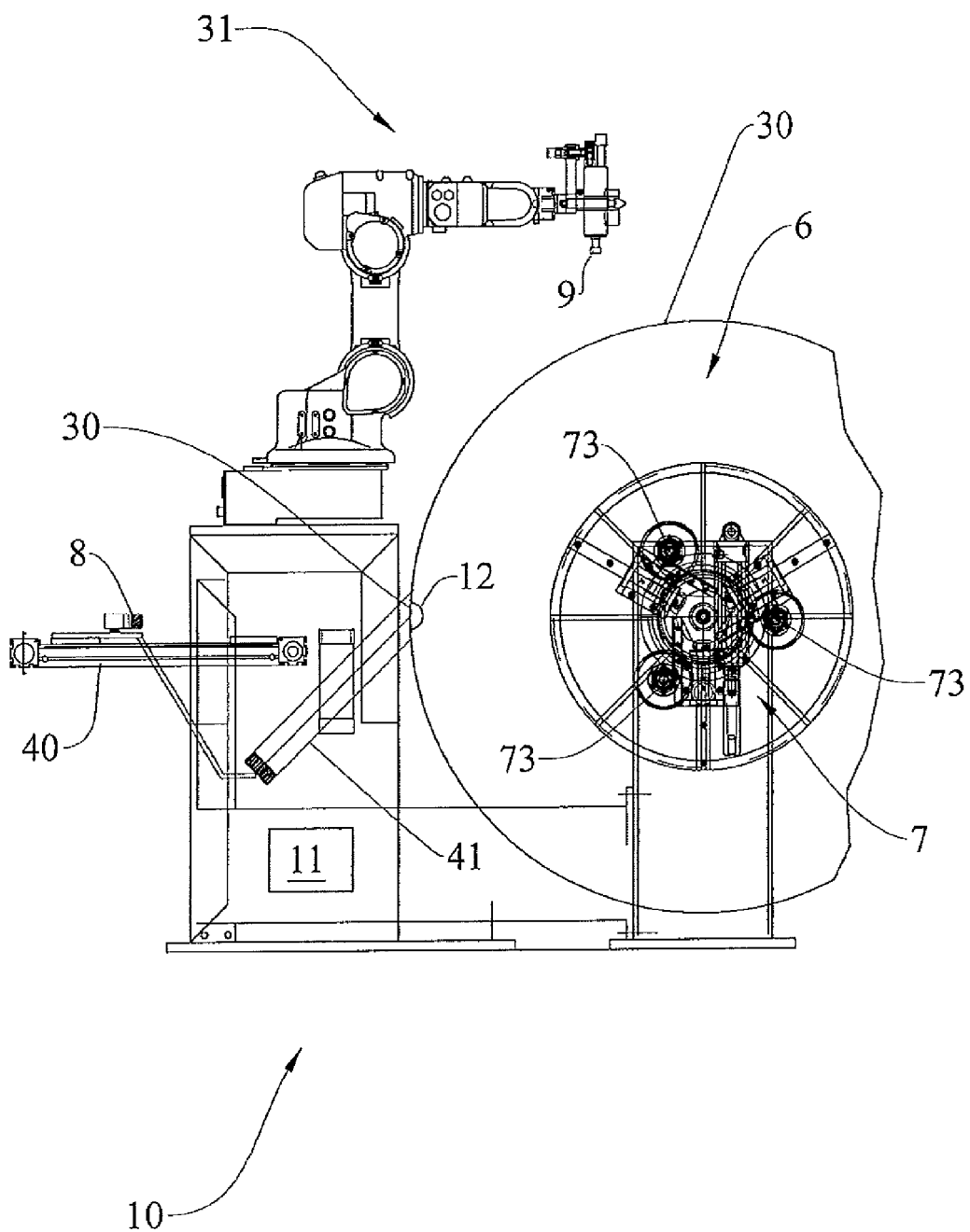

This is a national stage of PCT/EP10/053,829 filed Mar. 24, 2010 and published in English, which claims the priority of Italian number MI2009A000505 filed Mar. 31, 2009, hereby incorporated by reference.

CROSS-REFERENCE TO RELATED APPLICATIONS

Background of the Invention

The present invention relates to a process and a machine for the identification and working of defects on used tires.

Used tires undergo a known retreading operation that comprises the removal or scraping of the part remaining after wear to the tread and the application of a new tread before reuse.

Before this operation of applying the new tread is performed, it is necessary to identify precisely the defects, i.e. the surface damage caused by the impact with stiff bodies such as stones, nails and the like that may damage the tire, in particular the body of the tire.

The surface created by scraping can in fact highlight the defects that are then worked to eliminate the defects, or anyway eliminate the risk of spreading towards the body. To do so, small milling tasks are performed by the operators on the tires after scraping to form craters that are suitable for being subsequently coated.

In the prior art, the operator assembles the scraped tire onto a rotatable support such that the operator can view the entire scraped surface and recognise the defects; once the defect has been visually recognised the operator chooses the tool (commonly a diamond-tipped grindstone) and proceeds with the manual working to form a crater that will be subsequently coated.

The entire operation is particularly laborious and poses safety problems, in particular for the protection of the respiratory tract during the grinding of defects, which produces jets of rubbery waste residues.

BRIEF SUMMARY OF THE INVENTION

The object of the present invention is to make a process and a machine for the automatic identification and working of defects from used tires that enables the retreading of the tire to be speeded up safely.

According to the invention this object is achieved with an automatic process for the identification and working of defects on used tires, characterized in that it comprises the steps of:
assembling the used tire on rotative support and centring means;
starting the rotation of the tire;
automatic scanning of the working surface of the tire to identify the morphology of defects by means of automatic identification means of defects;
comparison between the morphology of the defect identified and a virtual library of defects of reference for the selection of the working and of the tool to be used;
charging the tool chosen on an anthropomorphic robot;
executing the selected working on the defect to form a crater that is suitable for being coated;
said steps being managed by a computerized control unit comprising said virtual library of defects.

According to the invention this process is conducted by a machine, characterized in that it comprises rotative support and centring means for supporting and centring the used tire, automatic identification means for identifying defects, an anthropomorphic robot, and computerised means suitable for comparing the morphology of the defect identified and a library of defects of reference for the selection of the working and of the tool to charge on said robot for the execution of the working.

BRIEF DESCRIPTIONS OF THE DRAWINGS

Figure 2:
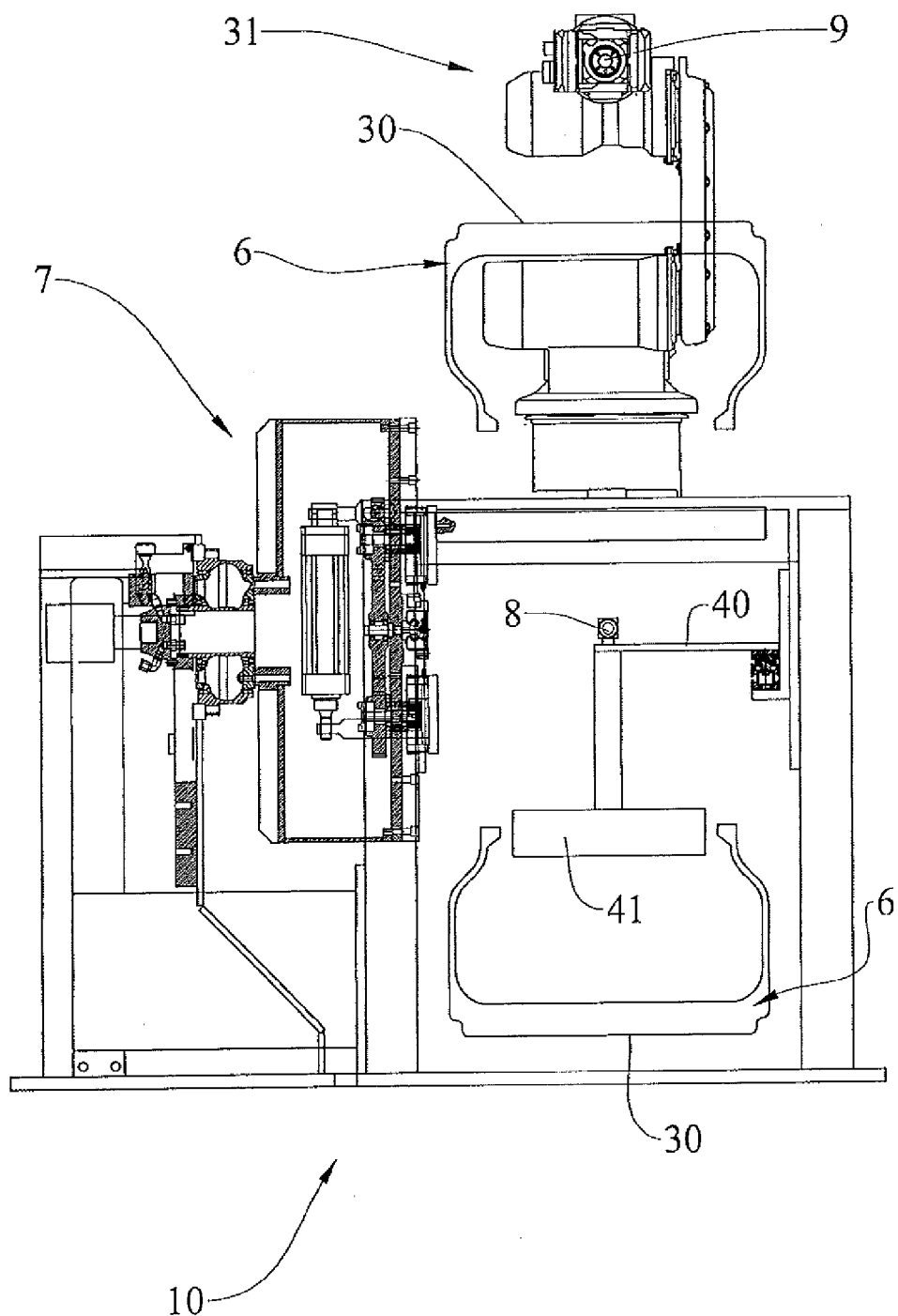

These and other features of the present invention will be made clearer from the following detailed description of a practical embodiment thereof illustrated by way of non limiting example in the attached drawings, in which:
FIG. 1 shows a side view of the machine;
FIG. 2 shows a partially sectioned front view of the machine.

DETAILED DESCRIPTION OF THE INVENTION

With reference to the attached figures, a machine 10 for the identification and working of defects 12 on scraped worn tires 6 is noted.

Said machine 10 comprising support means 7 for centring and rotating the scraped tires 6, identification means 8 (FIG. 3) of defects 12, classification means of the defect and choice of the suitable working means 11, and automatic working means 9 for working defects 12.

The work process of said machine 10 comprises the steps of:
assembling the scraped tire 6 on the rotative support and centring means 7;
starting up rotation by at least 360 degrees of the tire 6, the support means 7 being provided with a dedicated motor and arrest means;
automatic scanning or mapping of the scraped working surface 30 of the tire 6 to identify the morphology of defects 12 by means of automatic identification means 8 of defects 12;
automatic comparison between the morphology of the defect 12 identified and a virtual library of defects 12' of reference for the selection of the working and of the tool to be used;
automatic charging of the tool chosen on an anthropomorphic robot 31;
execution of the programming working on the defect 12 to form a final crater 13 that is suitable for being coated.

Said steps are managed by a computerized control unit 11 comprising the aforesaid virtual library of defects 12'.

The working to be executed for a defect 12 can be selected manually.

Advantageously, the automatic identification means 8 comprise visual identification means and typically infrared 41 cameras 8 of known type. The camera 8 is positioned automatically in function of the dimensions of the tire by positioning means 40.

Advantageously, the support means 7 comprise a three arm 73 motorized spindle, for automatic rotation of the tire 6.

The process disclosed above enables the technical problem of performing the operations of identifying and eliminating defects in an automated manner to be solved, bringing significant advantages in terms of safety in the workplace.

A protective frame with a safety hatch completely contains the machine 10, thus enabling the operator not to expose himself to jets of rubbery residues.

As the tire 6 rotates infrared cameras 8 scan or map defects 12. The collected images are processed via dedicated software by the computerized control unit 11 that generates three-dimensional models of defects 12. Said models are compared with a virtual library of defects 12' that is stored in the unit 11. The approach of the models of defects 12 to the defects 12' determines the choice of working and of the tool to be used.

After the tool is chosen, commonly a milling unit or diamond-tipped grindstone 9, the unit 11 commands charging of the chosen tool 9 on the anthropomorphic robot 31, which safely conducts the working of defects 12 selected for working.

At the end of a first working cycle the operator can decide whether to proceed to a second defects working cycle or return the tire for retreading.

The invention claimed is:

1. An automatic process for the identification and working of defects on used tires, characterized in that it comprises the steps of:
   a. Assembling the used tire on rotative support and centering means;
   b. Starting the rotation of the tire;
   c. Automatic scanning of the working surface of the tire to identify the morphology of defects by means of automatic identification means of defects;
   d. Comparison between the morphology of the defect identified and a virtual library of defects of reference for the selection of the working and of the tool to use;
   e. Charging the tool on an anthropomorphic robot;
   f. Executing the selected working onto the defect to form a crater suitable to be coated;
   said steps being managed by a computerized control unit comprising said virtual library of defects.

2. The process according to claim 1, characterized in that said automatic identification means comprise visual identification means.

3. The process according to claim 2, characterized in that said automatic identification means comprise infrared cameras.

4. The process according to claim 1, characterized in that said support means comprise a three arm motorized spindle.

5. A machine for the execution of the process according to claim 1, characterized in that it comprises rotative support and centering means for used tire, automatic identification means of the defects, an anthropomorphic robot, and computerized means suitable to compare the morphology of the defect identified with a library of defects of reference for the selection of the working and of the tool to charge on said robot for the execution of the working selected.

* * * * *